United States Patent
Li et al.

(10) Patent No.: US 8,150,207 B2
(45) Date of Patent: Apr. 3, 2012

(54) ACCELERATING THE HOUGH TRANSFORM

(75) Inventors: Wenlong Li, Beijing (CN); Tao Wang, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1069 days.

(21) Appl. No.: 11/967,701

(22) Filed: Dec. 31, 2007

(65) Prior Publication Data

US 2009/0169130 A1 Jul. 2, 2009

(51) Int. Cl.
*G06K 9/36* (2006.01)
*G01C 22/00* (2006.01)

(52) U.S. Cl. .................................. 382/281; 701/28
(58) Field of Classification Search .................. 382/281; 701/28

See application file for complete search history.

(56) References Cited

U.S. PATENT DOCUMENTS

| | | | |
|---|---|---|---|
| 3,069,654 A | 12/1962 | Hough | |
| 4,868,752 A * | 9/1989 | Fujii et al. | 701/28 |
| 4,891,751 A * | 1/1990 | Call et al. | 712/6 |
| 6,005,984 A * | 12/1999 | Kawakami et al. | 382/276 |
| 6,782,095 B1 * | 8/2004 | Leong et al. | 379/386 |
| 2002/0114518 A1* | 8/2002 | Wilt | 382/199 |
| 2006/0274973 A1* | 12/2006 | Mohamed et al. | 382/281 |

OTHER PUBLICATIONS

"A Real-Time Processor for the Hough Transform," .Keishi Hanahara et al, IEEE Transactions on Pattern Analysis and Machine Intelligence, vol. IO, No. 1, Jan. 1988, pp. 121-125.*
Lei Xu, "Randomized Hough transform (RHT): Basic mechanisms, algorithms, and computational complexities," Mar. 1993, Computer Vision, Graphics and Image Processing, vol. 57, No. 2, pp. 131-154.
Gerhard Roth, et al., "Geometric primitive extraction using a genetic algorithm," Sep. 1994, IEEE Transactions on Pattern Analysis and Machine Intelligence, vol. 16, No. 9, pp. 901-905.
Tianzi Jiang, et al., "Geometric primitive extraction using Tabu search," 1996, Proceedings of the 13th International Conference on Pattern Recognition, vol. 2, pp. 266-269.
Richard O. Duda, et al., "Use of the Hough transformation to detect lines and curves in pictures," Jan. 1972, Communications of the ACM, vol. 15, No. 1, pp. 11-15, available at: http://www.ai.sri.com/pubs/files/tn036-duda71.pdf.

(Continued)

*Primary Examiner* — Wenpeng Chen
(74) *Attorney, Agent, or Firm* — Grossman, Tucker, Perreault & Pfleger, PLLC (57) ABSTRACT

The present disclosure describes a method and apparatus for accelerating computation of a Hough transform of a plurality of digital images of known width and height dimensions. The method includes determining a plurality of Hough values for each pixel location based on the width and height dimensions. The method further includes generating a lookup table comprising an array of Hough values corresponding to one or more Hough parameters of at least one geometric shape in at least one digital image. Each element in the array of Hough values may be based on a value of one or more Hough parameters and at least one of a height value or a width value. The method may include receiving a plurality of digital images having known width and height dimensions. The method may further include selecting, for at least one nonzero pixel of at least one of the plurality of digital images, the Hough values from the lookup table. Of course, many alternatives, variations and modifications are possible without departing from this embodiment.

15 Claims, 5 Drawing Sheets

OTHER PUBLICATIONS

Sandy Pavel, et al., "Efficient Algorithms for the Hough Transform on Arrays with Reconfigurable Optical Buses," 1996 (10th International Parallel Processing Symposium), available at: http://citeseer.ist.psu.edu/cache/papers/cs/5815/http:zSzzSzwww.cs.queensu.cazSzhomezSzaklzSztechreportszSzhough.pdf/pavel96efficient.pdf.

R. Fisher, et al., "Hough Transform," 2003, available at http://homepages.inf.ed.ac.uk/rbf/HIPR2/hough.htm.

Sarita V. Adve, et al., "Comparison of Hardware and Software Cache Coherence Schemes," 1991, ACM Computer Architecture News, SIGARCH, vol. 19, No. 3, pp. 298-308.

"Hough transform," Feb. 2008, available at http://en.wikipedia.org/wiki/Hough_transform.

"Introduction to parallel computing," High performance computing at Lawrence Livermore National Laboratory, Sep. 2007, available at https://computing.llnl.gov/tutorials/parallel_comp/.

Jean-Philippe Farrugia, "GPUCV: A Framework for Image Processing Acceleration with Graphics Processors," Jul. 2006, Multimedia and Expo, 2006 IEEE International Conference, (Volume/Issue?) pp. 585-588.

Harvey Rhody, "Lecture 10: Hough circle transform," Oct. 2005, available at http://www.cis.rit.edu/class/simg782/lectures/lecture_10/lec782_05_10.pdf.

M. Wright, et al., "Beyond the Hough transform: Further properties of the R0 mapping and their applications," Object Representation in Computer Vision II, 1996, pp. 361-380, vol. 1144/1996.

Amin Sarafraz, "Line Detection via Standard Hough Transform," Mathworks Inc., May 23, 2004, available at http://www.mathworks.com/matlabcentral/fileexchange/loadFile.do?objectId=4983&ef=rssfeed&id=mostDownloadedFiles.

"Open Source Computer Vision Library—Overview," available at http://www.intel.com/technology/computing/opencv/overview.htm, retrieved on Oct. 19, 2007.

"Intel® Integrated Performance Primitives 5.3," available at http://www.intel.com/cd/software/products/asmo-na/eng/302910.htm, retrieved on Dec. 20, 2007.

Intel "C++Intrinsic Reference," available at http://softwarecommunity.intel.com/isn/downloads/softwareproducts/pdfs/347603.pdf, retrieved on Sep. 27, 2011.

"HoughLines2," available at http://www.comp.leeds.ac.uk/vision/opencv/opencvref_cv.html#decl_cvHoughLines2, retrieved Sep. 27, 2011 (pp. 28-30).

* cited by examiner

ACCELERATING THE HOUGH TRANSFORM

FIELD

The present disclosure describes a method and apparatus for accelerating the Hough transform.

BACKGROUND

It may be desirable to detect lines, circles, ellipses and other geometries in digital and/or video images. Such geometries may be detected through a brute force method of analyzing every group of points (or pixels). For example, to detect lines, every pair of points or pixels may be analyzed to find groups of collinear or nearly collinear points. Such an approach is computationally intensive and may not be efficient. The Hough transform may be used to detect a line, circle, ellipsoid or other geometry in a video and/or digital image. The Hough transform may provide a more desirable method of detecting such geometries.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure describes a method and apparatus for accelerating the Hough transform ("HT"). The method and apparatus may be used for image and/or video processing. The method and apparatus may be used to detect lines, circles, ellipses or other geometries in digital images. The method and apparatus may include sub-expression optimization by predetermining sub-expressions and storing the results. Sub-expression optimization may thereby avoid repetitive determination of sub-expression values during processing of multiple images. The method and apparatus may exploit vector processing to accelerate floating point operations and data type conversion from floating point to integer. The method may include a software cache to reduce memory allocation for frequently used data and to reduce repetitive computations. The method and apparatus may further include post-processing to improve the accuracy of HT line detection.

The HT may be used to transform a digital image from an image space to a parameter space. For example, a line that may be represented by a plurality of collinear points or pixels in a digital image may be represented by its slope and intercept parameters (Hough parameters) in a parameter space. Alternatively, the line may be represented by a length ($\rho$) parameter and an angle ($\theta$) parameter in the parameter space. In this case, the length may be the length of the normal to the line (i.e., the distance between the line and the origin). The angle may be the angle between the normal and the x-axis (i.e., horizontal axis). The angle may range between zero and $\pi$ radians. The length parameter may be positive or negative and may be limited by the dimensions of the digital image.

The relational equations may be represented by:

$$\rho = x\cos\theta + y\sin\theta \text{ and } y = -\frac{\cos\theta}{\sin\theta}x + \frac{\rho}{\sin\theta}$$

where $-\cos\theta/\sin\theta$ may be the slope of a line, $\rho/\sin\theta$ may be the y-intercept of the line, $\rho$ is the length of the normal to the line, $\theta$ is the angle between the normal and the horizontal axis and, x and y may be coordinates of a point (e.g., a pixel) in the image space. Accordingly, a line in the image space may be represented by a point ($\theta$, $\rho$) in the parameter space.

Similarly, a point ($x_0$, $y_0$) in the image space may correspond to a periodic waveform in the parameter space ($\rho = x_0 \cos\theta + y_0 \sin\theta$). A series of collinear points in the image space may correspond to a series of concurrent curves in the parameter space. The intersection of the curves may correspond to the normal and angle of the normal of a line through the series of collinear points. Detecting a line or lines, for example, in a digital image may include finding one or more points of intersection of curves in the parameter space.

While a line may be represented by two Hough parameters (e.g., $\theta$ and $\rho$), a circle, for example, may be represented by three Hough parameters (center coordinates and radius). Detecting a circle, for example, may include finding one or more points of intersection of cones in the parameter space. In this case, the parameter space may have three dimensions: the two dimensional coordinates of the center of the circle and the circle's radius. More complex geometries may be represented by more parameters. For example, an ellipse may be represented by five parameters.

Digital images may be considered to be inherently quantized. Noise may be present in digital images. Determination of points of intersection may be facilitated by including an acceptable error range about each point of intersection. Points of intersection may then be determined by computing periodic waveforms for each point in the digital image and accumulating the number of waveforms that pass through each point in the parameter space. In other words, the number of waveforms that pass through a point plus or minus the error range may be accumulated.

Points in the parameter space may be ($\theta$, $\rho$) for a line and (a, b, r) for a circle where a and b correspond to the coordinates of the center of the circle and r corresponds to the circle's radius. At the completion of computation, relatively higher accumulator values may correspond to lines in the image space. In other words, the accumulator values may represent the number of waveforms that intersect at that point. The number of waveforms may correspond to the number of collinear points in the image space.

Figure 1:
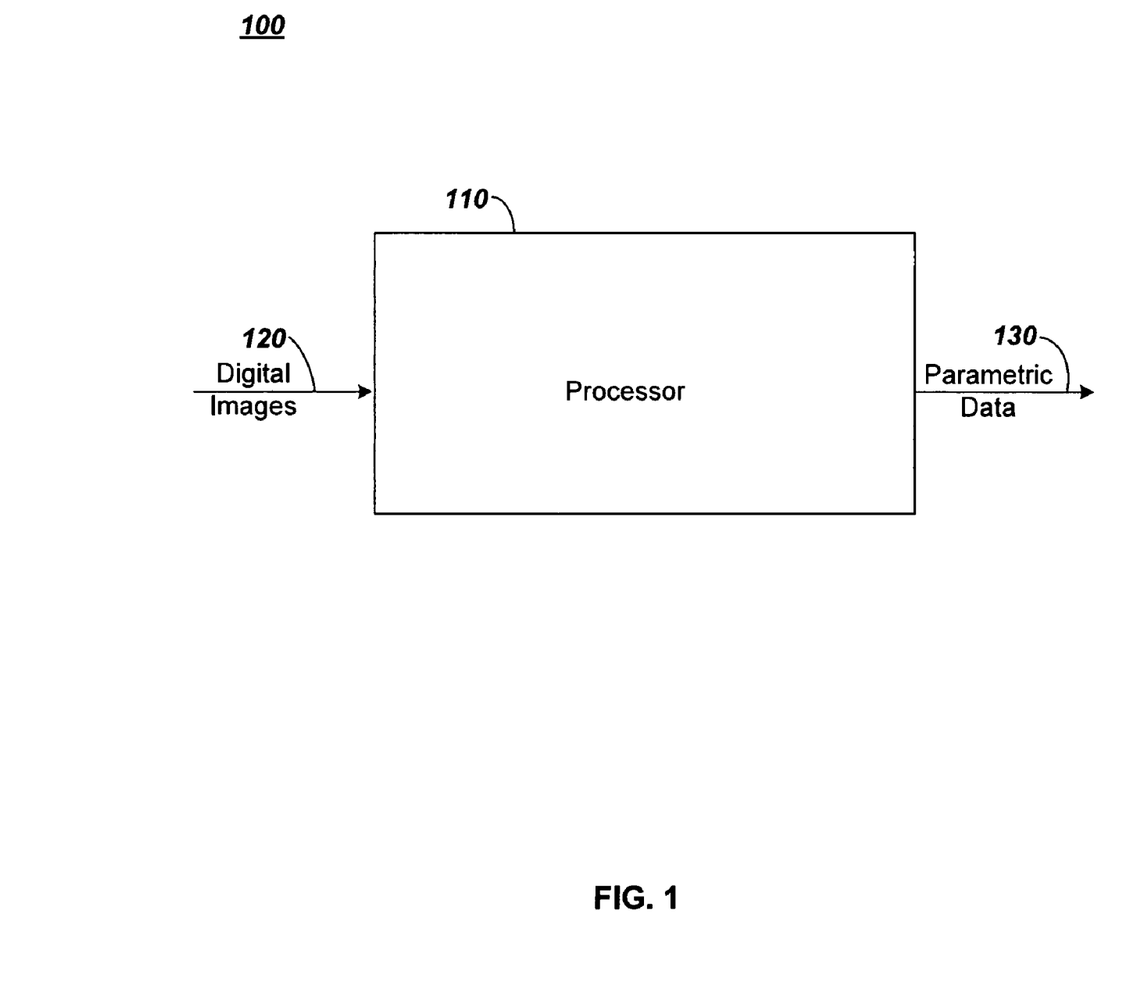
FIG. 1 illustrates an exemplary functional block diagram, consistent with the present disclosure.

Attention is directed to FIG. 1 which depicts an illustrative functional block diagram 100 of one embodiment of an apparatus for finding lines, circles, ellipses and/or other geometries in digital images. The apparatus may include a processor 110. The processor 110 may be a video processor. The processor 110 may include one or more processors that may share memory. The processor 110 may be configured to process video and/or digital images in a manner understood in the art and detailed herein.

The processor 110 may be configured to receive video and/or digital images. A digital image may have a width and a height. The width and height may be measured in pixels. A digital image may contain one or more lines or other geometries. It may be desirable to detect the lines or other geometries. The processor 110 may be further configured to provide parametric data as output. In an embodiment, parametric data may include normal and angle data for a line or lines. In another embodiment, the parametric data may include the coordinates of the center of a circle and the circle's radius.

Figure 2A:
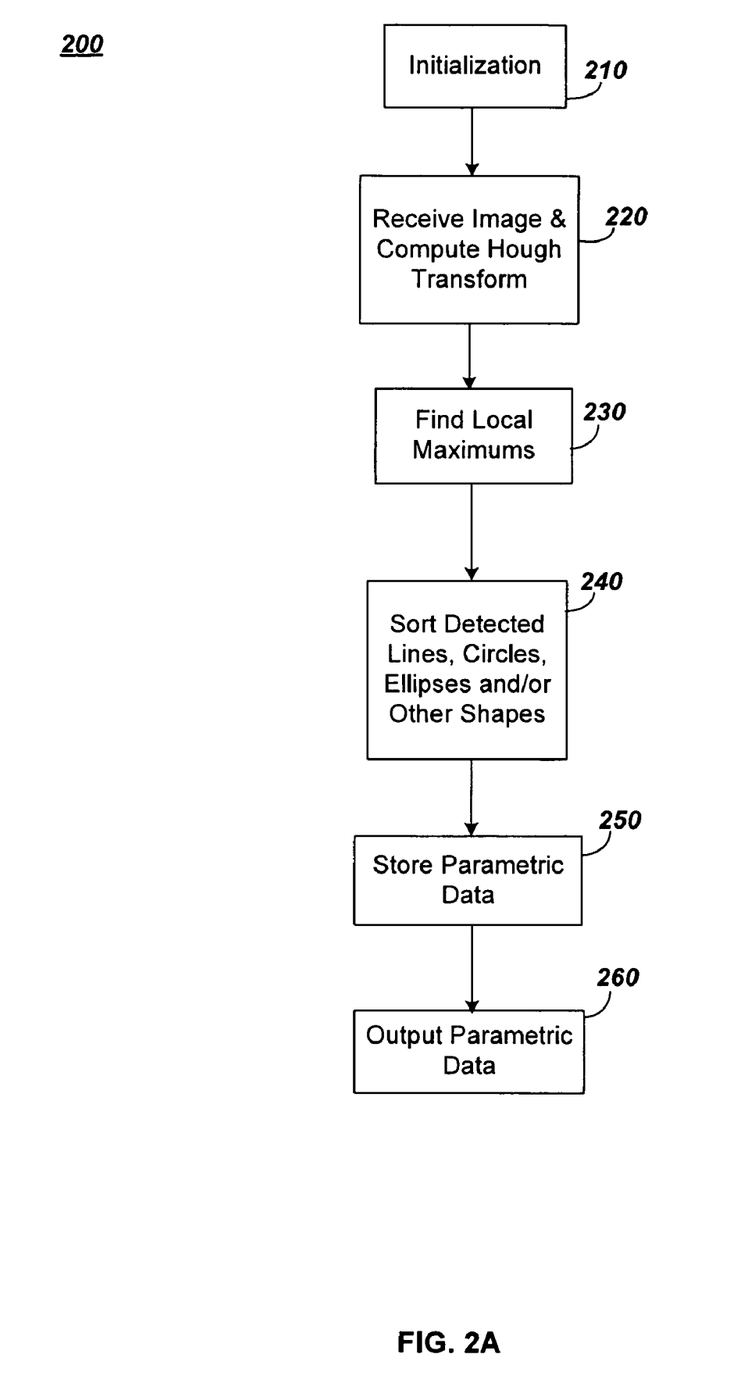
FIG. 2A depicts an exemplary flow chart that may be used to detect lines, circles, ellipses and/or other shapes in a digital image.

FIG. 2A depicts an illustrative flowchart 200 for detecting lines or other geometries in a digital and/or video image. The illustrative flowchart 200 may represent a line detection algorithm available in open source computer vision software (OpenCV). Operations may include initializations 210. The initializations may include computing, and storing in lookup tables, sine and cosine of angles between zero and $\pi$ radians. The angles may be quantized (i.e., discrete). An angle of $\pi$ radians may correspond to number (e.g., numangle) discrete angle increments. A lookup table may be understood to include an array of elements. The size of a lookup table may be understood to mean the number of elements in the array.

Operations may include receiving, by a processor, a digital and/or video image 220. The digital and/or video image may be one of a plurality of such images. Operations may also include computing a Hough transform 220. Computing the Hough transform 220 may include computing for each nonzero point in the image space, a periodic waveform. A nonzero point in the image space may correspond to a point on a line, circle, ellipse or other geometry. A zero point in the image space may correspond to a blank point. Computing the Hough transform, may further include accumulating the number of waveforms that pass through a point ($\theta,\rho$) in the parameter space.

Operations may further include finding local maximums in the accumulated number of waveforms 230. Operations may include sorting the local maximums and thereby sorting detected geometries 240. Operations may include storing parametric data corresponding to the local maximums and detected geometries 250. Operations may further include outputting the stored parametric data 260.

The code sequence in Table 1 below may correspond to one embodiment of the operations depicted in flowchart 200. Lines 1 through 6 may correspond to the initialization operation 210. Lines 7 through 18 may correspond to the operation of computing HT 220. Lines 19 through 29 may correspond to the operation of finding the local maximums 230. Lines 30 through 32 may correspond to the sort operation 240. Lines 33 through 44 may correspond to storing parametric data 250 and outputting parametric data 260.

TABLE 1

Detection of geometric shapes in a digital image.

```
1 // Initialization phase
2 for( ang = 0, n = 0; n < numangle; ang += theta, n++ )
3 {
4     tabSin[n] = (float)(sin(ang) * irho);
5     tabCos[n] = (float)(cos(ang) * irho);
6 }
7 // stage 1. Kernel of Hough transform.
8 for( j = 0; j < height; j++ )
9     for( i = 0; i < width; i++ )
10    {
```

TABLE 1-continued

Detection of geometric shapes in a digital image.

```
11     if( image[j * step + i] != 0 )
12         for( n = 0; n < numangle; n++ )
13         {
14             r = cvRound( i * tabCos[n] + j * tabSin[n] );
15             r += (numrho - 1) / 2;
16             accum[(n+1) * (numrho+2) + r+1]++;
17         }
18  }
19  // stage 2. find local maximums
20  for( r = 0; r < numrho; r++ )
21      for( n = 0; n < numangle; n++ )
22      {
23          int base = (n+1) * (numrho+2) + r+1;
24          if( accum[base] > threshold &&
25              accum[base] > accum[base - 1] &&
        accum[base] >= accum[base + 1] &&
26              accum[base] > accum[base - numrho - 2] &&
        accum[base] >= accum[base + numrho + 2] )
27              sort_buf[total++] = base;
28      }
29
30  // stage 3. sort the detected lines by accumulator value
31  icvHoughSortDescent32s( sort_buf, total, accum );
32
33  // stage 4. store the first min(total,linesMax) lines to the output
    buffer
34  linesMax = MIN(linesMax, total);
35  scale = 1./(numrho+2);
36  for( i = 0; i < linesMax; i++ )
37  {
38      CvLinePolar line;
39      int idx = sort_buf[i];
40      int n = cvFloor(idx*scale) - 1;
41      int r = idx - (n+1)*(numrho+2) - 1;
42      line.rho = (r - (numrho - 1)*0.5f) * rho;
43      line.angle = n * theta;
44      cvSeqPush( lines, &line );
        }
```

Line 14 (sub-expression) may correspond to relatively computationally intense floating point operations including conversion to integers. For a plurality of images, these operations may be performed repeatedly. In other words, because of their location in the Hough transform kernel, these operations may be performed for each image.

The operations in line 14 may depend on the height and width of the image being processed. In many situations, the height and width of an image may be known in advance. In many cases, the height and width of the images may be constant for a plurality of images. The operations in line 14 may be repetitive for a plurality of images that have the same height and width. Computation time may be reduced by precomputing line 14 prior to computing the Hough transforms for a plurality of such images.

Figure 2B:
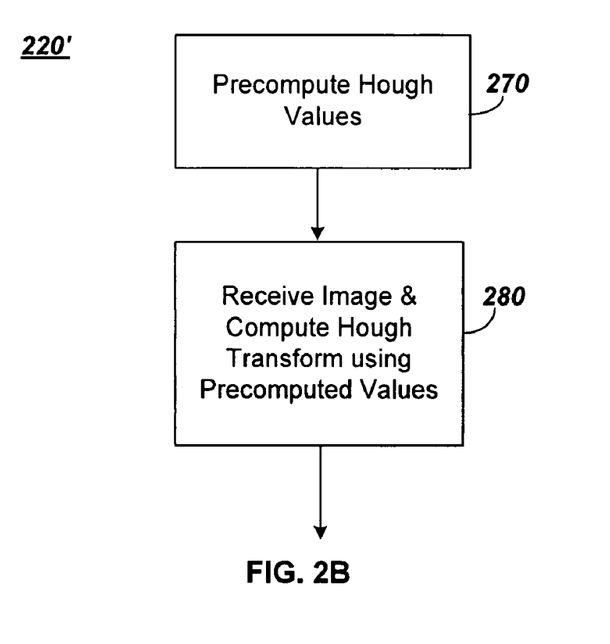
FIGS. 2B and 2C depict flow charts illustrating two embodiments for finding lines, circles, ellipses and/or other shapes in a digital image.

FIG. 2B depicts a flowchart 220' of one embodiment for computing the Hough transform consistent with the present disclosure. Operations may include precomputing Hough values 270. The Hough values may be computed once for a plurality of images. Operations may further include receiving a digital image and computing the Hough transform using the precomputed values 280. The Hough transform may be computed for each image of the plurality of images using the precomputed Hough values.

The code sequence listed in Table 2 below may correspond to the embodiment depicted in FIG. 2B. Lines 1 through 8 may correspond to precompute Hough values 270. Lines 9 through 21 may correspond to computing the Hough transform using the precomputed values.

TABLE 2

Single lookup table improvement to Hough transform

```
    // Pre-compute the statement and save the values into array
        int *const_hough_value = new int[height * width * numangle];
        int index = 0;
1   for( j = 0; j < height; j++ )
2     for( i = 0; i < width; i++ )
3     {
4         for( n = 0; n < numangle; n++, index++)
5         {
6            const_hough_value[index] =
                cvRound( i * tabCos[n] + j * tabSin[n] );
7         }
8   }
    // Kernel of Hough transform with sub-expression optimization
9   for( j = 0; j < height; j++ )
10    for( i = 0; i < width; i++ )
11    {
12        if( image[j * step + i] != 0 )
13        {
14            index = (j * width + i) * numangle;
15            for( n = 0; n < numangle; n++ )
16            {
17               r = (numrho − 1) / 2 + const_hough_value[index + n];
18               accum[(n+1) * (numrho+2) + r+1]++;
19            }
20        }
      }
```

In this embodiment, the floating point operations and conversion to integers (sub-expression) may be performed once prior to computing the Hough transforms for a plurality of images. The results of these floating point operations and conversion to integers may be stored in a lookup table (e.g., const_hough_value). The lookup table may then be available for each subsequent image. This embodiment may result in fewer floating point operations and fewer conversions from floating point to integer. In other words, the Hough value computations of line 14 in Table 1, may be performed once for a plurality of images rather than repetitively for each image. The operation of computing the Hough transform 280 may then be more efficient.

Figure 2C:
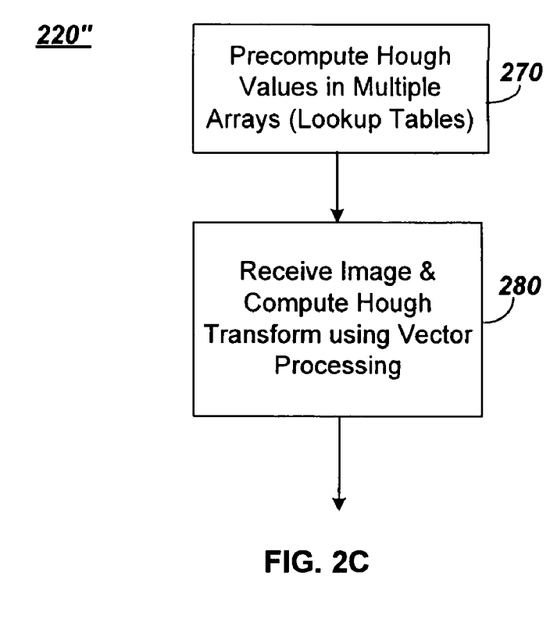

FIG. 2C depicts a flowchart 220" of another embodiment for computing the Hough transform consistent with the present disclosure. Operations may include precomputing Hough values in multiple arrays 270'. Similar to the embodiment shown in FIG. 2B and Table 2, the Hough values may be computed once for a plurality of images. In this embodiment, the values may be stored in a plurality of lookup tables. This plurality of lookup tables may occupy less memory than the single array discussed above (FIG. 2B, Table 2). Operations may further include receiving a digital image and computing the Hough transform using the precomputed values, utilizing a processor capable of vector processing 280'.

The code sequence listed in Table 3 below may correspond to the embodiment depicted in FIG. 2C. Lines 1 through 18 may correspond to precompute Hough values in multiple lookup tables 270'. Lines 19 through 43 may correspond to computing the Hough transform using precomputed values and utilizing vector processing.

TABLE 3

Multiple lookup tables and vector processing improvements to Hough transform

```
    // Pre-compute the statement and save the values into two smaller arrays
        int *width_hough_value = new int[width * numangle];
        int *height_hough_value = new int[height * numangle];
        int *rho = new int[numangle];
        int width_index = 0;
1   for( i = 0; i < width; i++ )
2   {
3       width_index = i * numangle;
4       for( n = 0; n < numangle; n++)
5       {
6           width_hough_value[width_index + n] = i * tabCos[n];
7       }
8   }
9   int height_index = 0;
10  for(j= 0; j < height; j++ )
11  {
12      height_index = j * numangle;
13      for( n = 0; n < numangle; n++)
14      {
15          height_hough_value[height_index + n] = j * tabSin[n];
16      }
17  }
18
    // Kernel of Hough transform with SIMD optimization
        int elementSize = numangle / 4;
19  for( j = 0; j < height; j++ )
20  {
21      height_index = j * numangle;
22      for( i = 0; i < width; i++ )
23      {
24          width_index = i * numangle;
25          if( image[j * step + i] != 0 )
26          {
27              for( n = 0; n < elementSize; n++ )
28              {
29                  __m128 xmm1 = _mm_load_ps((float
    *)&height_hough_value[height_index + n * 4]);
30                  __m128 xmm2 = _mm_load_ps((float
    *)&width_hough_value[width_index + n * 4]);
31                  __m128 xmm3 = _mm_add_ps(xmm1, xmm2);
32                  __m128i xmm4 = _mm_cvttps_epi32(xmm3);
33                  _mm_store_si128((__m128i *)&rho[n * 4], xmm4);
34              }
                // Handle the left elements, which means numangle % 4 != 0
35              for (n = elementSize * 4; n < numangle; n++)
36                  rho[n] = (int)(height_hough_value[height_index + n] +
    width_hough_value[width_index + n]);
                // fill the accumulator
37              for( n = 0; n < numangle; n++ )
38              {
39                  r = (numrho − 1) / 2 + rho[n];
40                  accum[(n+1) * (numrho+2) + r+1]++;
41              }
42          }
43      }
    }
```

In this embodiment, similar to the embodiment depicted in FIG. 2B, floating point operations and conversion to integers may be performed once prior to computing the Hough transforms for a plurality of images. In this embodiment, the results may be stored in a plurality of arrays. The total number of memory locations allocated for the plurality of arrays (e.g., width_hough_value, height_hough_value, rho) may be less than the number of memory locations allocated for the lookup table const_hough_value discussed above. For example, the const_hough_value array may have size: height*width*numangle, while the plurality of arrays may have total size: numangle*(width+height+1).

In this embodiment, the Hough transform may be computed using vector processing. The processor (e.g., processor 110 of FIG. 1) may be capable of SIMD operation. SIMD may be understood to mean single instruction, multiple data. In other words, the processor may be configured to process multiple data elements with a single instruction. For example, a single instruction may operate on four data points in parallel. An example of such a processor may be an XEON processor by Intel Corporation.

For example, line 29 of Table 3 may operate to load four values from height_hough_value into register xmm1. Line 30 may operate to load four values from width_hough_value into register xmm2. Registers xmm1 and xmm2 may each be capable of holding four 32-bit floating point values. Line 31 may operate to add each pair of values, in parallel. Line 32 may operate to convert each of the four results from floating point to integer. Line 33 may operate to store the four integer results in array rho.

Operations may be further parallelized by using multiple processors. These multiple processors may share memory and may operate in parallel. Such a configuration of processors and memory may be an SMP configuration. SMP may be understood to mean shared memory processors or symmetric multiprocessors. For example, sixteen processors may be used (with shared memory) and may provide SIMD where a single instruction operates on 64 data points. In other embodiments, a different number of processors may be used.

Parallel processing (i.e., vector processing) may reduce the overall processing time when compared to SISD (single instruction, single data) sequential processing. Accordingly, a Hough transform may be computed relatively more quickly in these embodiments when compared to an embodiment where each instruction operates on one data point.

Figure 3:
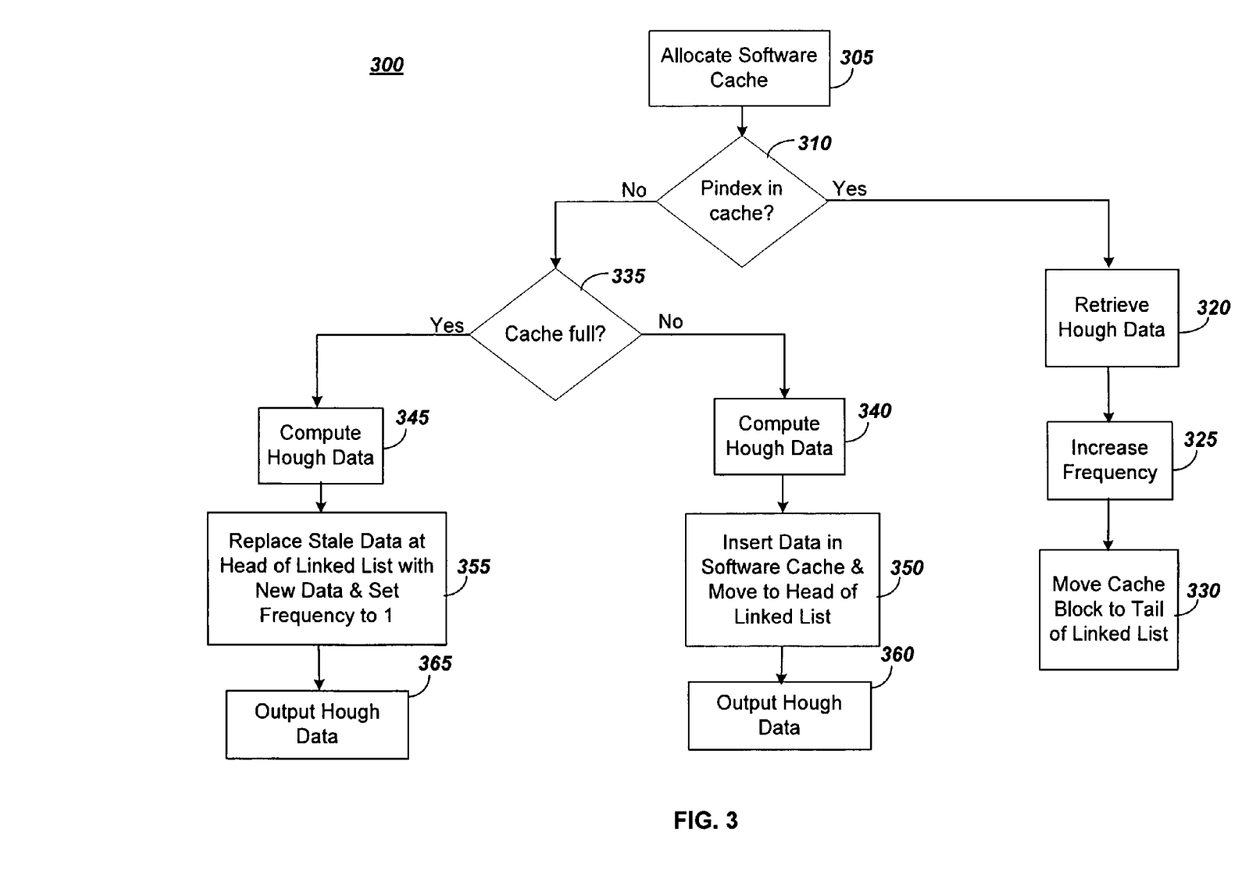
FIG. 3 depicts an exemplary flow chart illustrating another embodiment consistent with the present disclosure.

FIG. 3 depicts a flowchart 300 according to another exemplary embodiment, consistent with the present disclosure. Operations may include allocation of a continuous memory space as a software cache 305. The software cache may defined with size: cache_size. The software cache may include a plurality of cache blocks and each cache block may contain an array. Each array may have height+width number of elements. The software cache may then have cache_size/(height+width) cache lines.

Operations may include, for each non-zero image pixel and its associated index, determining whether the pixel index (e.g., pindex) has been cached 310. In an embodiment, operations may include utilizing a hashing technique to accelerate the query process. If the pixel index is not in the software cache (i.e., cache miss), operations may include determining whether the software cache is full 335. If the software cache is full, operations may include computing the Hough data 345.

Operations may then include using a Least Recently Used policy for replacing stale cache data 355. Operations may further include using a linked list to record a cache line history. The cache line history may include index information. In an embodiment, the cache line history may also include frequency information 355. Operations may include replacing stale data at the head of the linked list with new data 355. In an embodiment, the operations may also include setting a frequency associated with the new data to one 355. Operations may further include outputting the Hough data 365.

If the pixel index is not in the software cache and the software cache is not full, operations may include computing the Hough data 340. Operations may further include inserting the new Hough data in the software cache 350. The new Hough data may be moved to the head of the linked list 350. Operations may further include outputting the Hough data 360.

If the pixel index is in the software cache (i.e., cache hit), operations may include retrieving the Hough data from the software cache 320. In an embodiment, operations may include increasing the frequency of the retrieved Hough data 325. Operations may further include moving the cache block to the tail of the linked list 330.

The embodiments that include a software cache may accelerate detection of lines and other geometries in a plurality of digital and/or video images. For example, Hough data may be computed once and may then be stored in the software cache. If the data is not evicted from the software cache, then it may be available for computing the Hough transform for subsequent images. In other words, the Hough data would not need to be recomputed. Use of a software cache may allow allocation of relatively less memory space for storing frequently used data and thereby make relatively more efficient use of a memory subsystem. Rather than storing data for the entire parameter space, only Hough data corresponding to nonzero pixels may be stored in the cache. Further, in these embodiments, initializing all data arrays may not be required thereby reducing initialization overhead. These embodiments may be utilized for more general video and image processing (i.e., may not be limited to geometric shape detection). The software cache embodiments may further be integrated into a multithreaded environment.

Figure 4:
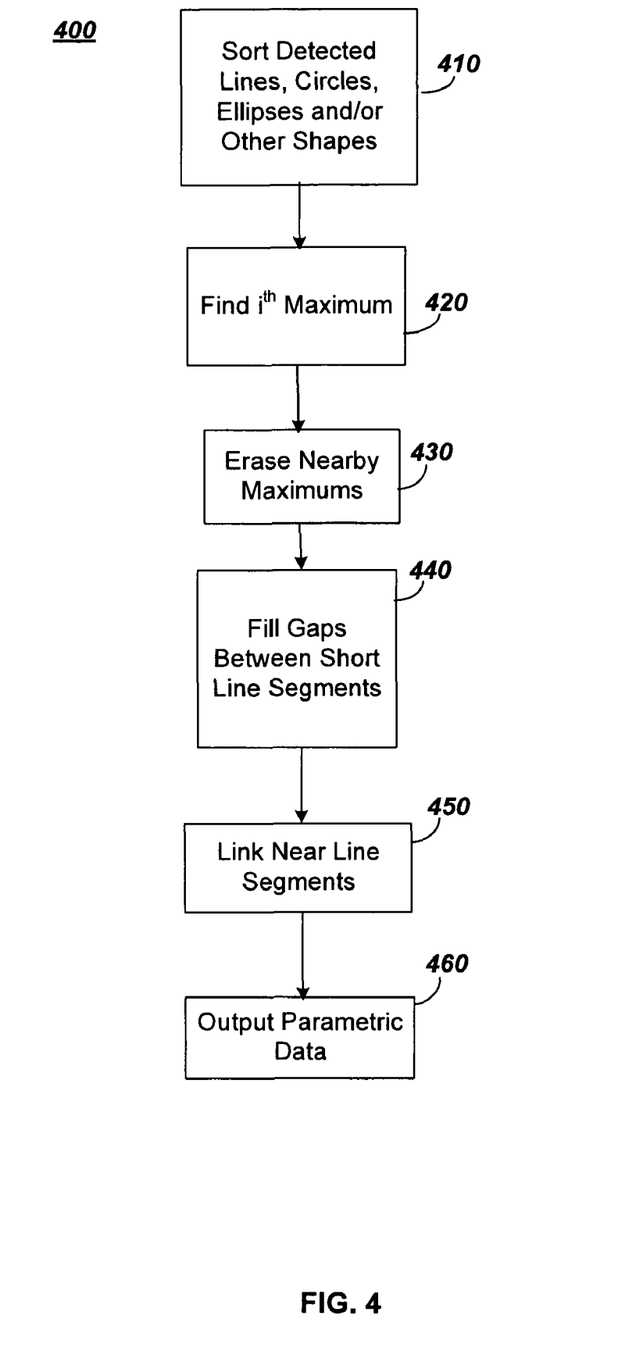
FIG. 4 depicts an exemplary flowchart illustrating yet another embodiment consistent with the present disclosure.

FIG. 4 depicts a flowchart 400 according to another exemplary embodiment, consistent with the present disclosure. Operations depicted in the flowchart 400 may improve the accuracy of geometric shape detection using the Hough transform. Operations may include sorting detected lines, circles, ellipses and/or other shapes 410. One or more of the operations depicted in flowchart 400 may follow the operations depicted in FIGS. 2A through 2C.

In an embodiment, operations may include, determining a maximum accumulated number of waveforms 420. Operations may then include selectively erasing nearby maximums of accumulated numbers of waveforms 430. In another embodiment, operations may include filling gaps between short line segments 440. In yet another embodiment, operations may include linking line segments that may be relatively close to one another 450.

The pseudocode listed in Table 4 below may correspond to the embodiments depicted in FIG. 4. Lines 1 through 6 may correspond to sorting detected shapes 410, finding an $i^{th}$ maximum 420 and selectively erasing nearby maximums 430. Lines 7 through 14 may correspond to filling the gaps between short line segments 440, linking nearby line segments 450 and outputting parametric data 460.

TABLE 4

Post processing improvements to geometric shape detection

```
1 // stage 3. sort the detected lines by accumulator value
2 for( i = 0; i < peaknum; i++ )
3 {
4      Find the i^th maximum in sort_buf[ ];
5      Erase maximums near the i^th maximum in sort_buf[ ];
6 }
7 // stage 4. store the first min(total,linesMax) lines to the output buffer
8 for( i = 0; i < peaknum; i++ )
9 {
10     Fill gaps between short line segments on the line of the
       i^th maximum;
11     Link near line segments;
12     if multiple line segments and almost filled, output a combined
       line segment
13     Else output line segments on the line of of the i^th maximum;
       }
```

The embodiments may enhance line and/or other geometric shape detection.

Tables 5 and 6 below contain performance comparison data for line detection in MPEG1 and MPEG2 example images, respectively. In the tables, "ProcNum" corresponds to the number of processors used in the vector processing. The data may illustrate performance improvement in line detection. In the tables, "OpenCV" corresponds to the code sequence shown in Table 1, "Precomputing & Vector Processing" corresponds to the code sequence shown in Table 3 and "Software Cache" corresponds to the pseudocode operations shown in FIG. 3. The data for both embodiments (Precomputing & Vector Processing and Software Cache) illustrate relatively improved performance over the OpenCV example.

TABLE 5

Performance comparison on MPEG1 data

| | Execution Time (s) | | | Performance Gain (%) | |
|---|---|---|---|---|---|
| ProcNum | OpenCV | Pre-computing & Vector Processing | Software Cache | Pre-computing & Vector Processing | Software Cache |
| 1 | 277.7 | 227.8 | 213.9 | 18.0 | 23.0 |
| 2 | 139.6 | 117.6 | 109.1 | 15.8 | 21.8 |
| 4 | 73.4 | 64.1 | 59.3 | 12.7 | 19.2 |
| 8 | 36.1 | 32.6 | 30.5 | 9.7 | 15.5 |
| 16 | 30.6 | 29 | 26.2 | 5.2 | 14.4 |

TABLE 6

Performance comparison on MPEG2 data

| | Execution Time (s) | | | Performance Gain (%) | |
|---|---|---|---|---|---|
| ProcNum | OpenCV | Pre-computing & Vector Processing | Software Cache | Pre-computing & Vector Processing | Software Cache |
| 1 | 1230 | 992 | 682 | 19.3 | 44.6 |
| 2 | 629 | 510 | 356 | 18.9 | 43.4 |
| 4 | 343 | 285 | 207 | 16.9 | 39.7 |
| 8 | 178 | 150 | 113 | 15.7 | 36.5 |
| 16 | 98 | 86 | 70 | 12.2 | 28.6 |

Embodiments of the methods described herein may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of accelerating computation of a Hough transform of a plurality of digital images of known width and height dimensions, comprising:
   determining a plurality of Hough values for each pixel location based on the width and height dimensions;
   generating a lookup table stored in memory comprising an array of Hough values corresponding to one or more Hough parameters of at least one geometric shape in at least one digital image, wherein each element in said array of Hough values is based on a value of said one or more Hough parameters and at least one of a height value or a width value;
   sorting detected shapes;
   determining a maximum accumulated number of waveforms;
   selectively erasing nearby maximums of accumulated numbers of waveforms;
   filling gaps between short line segments;
   linking line segments that are nearby; and
   outputting parametric data.

2. The method of claim 1, further comprising:
   receiving a plurality of digital images having known width and height dimensions; and
   selecting, for at least one nonzero pixel of at least one of the plurality of digital images, one or more Hough values from said lookup table.

3. The method of claim 1, wherein said geometric shape is a line and said Hough parameters are a length of a normal to said line and an angle between said normal and a horizontal axis.

4. The method of claim 1, wherein said geometric shape is a circle and said Hough parameters are coordinates of a center of said circle and a radius of said circle.

5. The method of claim 1, wherein each said element in said array of Hough values is based on a height value and a width value.

6. A processor for detecting a geometric shape in a digital image of known width and height dimensions comprising:
   electronic circuitry configured to determine a plurality of Hough values for each pixel location based on the width and height dimensions;
   configured to generate a lookup table comprising an array of Hough values corresponding to one or more Hough parameters of at least one geometric shape in at least one digital image, wherein each element in said array of Hough values is based on a value of said one or more Hough parameters and at least one of a height value or a width value;
   configured to sort detected shapes;
   configured to determine a maximum accumulated number of waveforms;
   configured to selectively erase nearby maximums of accumulated numbers of waveforms;
   configured to fill gaps between short line segments;
   configured to link line segments that are nearby; and
   configured to output parametric data.

7. The processor of claim 6, further comprising:
electronic circuitry configured to receive a plurality of digital images having known width and height dimensions; and
configured to select, for at least one nonzero pixel of at least one of the plurality of digital images, one or more Hough values from said lookup table.

8. The processor of claim 7, wherein said processor is a vector processor further comprising electronic circuitry configured to operate on a plurality of Hough values simultaneously.

9. The processor of claim 7, wherein said processor comprises a plurality of vector processors wherein each said vector processor further comprises electronic circuitry configured to operate on a plurality of Hough values simultaneously and wherein said vector processors share memory.

10. The processor of claim 8, wherein said processor is configured to operate on four Hough values simultaneously.

11. The processor of claim 9, wherein each said processor is configured to operate on four Hough values simultaneously.

12. An article, comprising:
a non-transitory storage medium having stored thereon instructions that when executed by a processor results in the following:
determining a plurality of Hough values for each pixel location based on the width and height dimensions;
generating a lookup table comprising an array of Hough values corresponding to one or more Hough parameters of at least one geometric shape in at least one digital image, wherein each element in said array of Hough values is based on a value of said one or more Hough parameters and at least one of a height value or a width value;
sorting detected shapes;
determining a maximum accumulated number of waveforms;
selectively erasing nearby maximums of accumulated numbers of waveforms;
filling gaps between short line segments;
linking line segments that are nearby; and
outputting parametric data.

13. The article of claim 12, wherein said instructions that when executed by said processor result in the following additional operations:
receiving a plurality of digital images having known width and height dimensions; and
selecting, for at least one nonzero pixel of at least one of the plurality of digital images, one or more Hough values from said lookup table.

14. The article of claim 12, wherein said instructions that when executed by said processor result in the following additional operations:
receiving a plurality of digital images having known width and height dimensions; and
selecting, for at least one nonzero pixel of at least one of the plurality of digital images, a plurality Hough values simultaneously from said lookup table.

15. The article of claim 14, wherein said instructions that when executed by said processor result in the following additional operations:
operating on said plurality of Hough values simultaneously and determining a Hough transform for said nonzero pixel.

* * * * *